United States Patent
Clark

(10) Patent No.: US 7,684,324 B2
(45) Date of Patent: Mar. 23, 2010

(54) SYSTEM AND METHOD FOR PRIORITIZING INDIVIDUAL STREAMS WITHIN A MULTIMEDIA FLOW

(75) Inventor: Alan D. Clark, Duluth, GA (US)

(73) Assignee: Telchemy, Inc., Duluth, GA (US)

( * ) Notice: Subject to any disclaimer, the term of this patent is extended or adjusted under 35 U.S.C. 154(b) by 933 days.

(21) Appl. No.: 11/314,720

(22) Filed: Dec. 20, 2005

(65) Prior Publication Data

US 2006/0268701 A1 Nov. 30, 2006

Related U.S. Application Data

(60) Provisional application No. 60/638,368, filed on Dec. 20, 2004.

(51) Int. Cl.
*H04L 12/26* (2006.01)
(52) U.S. Cl. .................. 370/230; 370/395.42; 370/493
(58) Field of Classification Search ............ 370/395.21, 370/395.41, 395.42, 493, 468
See application file for complete search history.

(56) References Cited

U.S. PATENT DOCUMENTS

| | | | |
|---|---|---|---|
| 6,442,166 B1 * | 8/2002 | McDonald et al. ..... | 370/395.42 |
| 6,654,376 B1 * | 11/2003 | Stacey et al. ........... | 370/395.21 |
| 6,760,309 B1 * | 7/2004 | Rochberger et al. ......... | 370/235 |
| 6,798,743 B1 | 9/2004 | Ma et al. | |
| 6,882,625 B2 * | 4/2005 | Le et al. .................... | 370/238 |
| 2003/0189943 A1 | 10/2003 | Gorti | |

OTHER PUBLICATIONS

"Congestion Management Overview," Cisco IOS Quality of Service Solutions Configuration Guide, Oct. 2000, http://www.ictp.trieste.it/~manuals/cisco/ios121/121cgcr/qos_c/qcprt2/qcdconmg.htm.

* cited by examiner

*Primary Examiner*—Chirag G Shah
*Assistant Examiner*—Minh-Trang Nguyen
(74) *Attorney, Agent, or Firm*—Smith, Gambrell & Russell

(57) ABSTRACT

The present invention provides a system and method for prioritizing delay-sensitive packets relative to each other for transmission from a router in a network, based on a delay variation estimated for each delay-sensitive packet by a quality of service monitor. In accordance with the present invention, late delay-sensitive packets are assigned a higher priority than, and are transmitted before, other delay-sensitive packets, thereby reducing the level of jitter and improving the quality of the packet streams that comprise late delay-sensitive packets.

6 Claims, 3 Drawing Sheets

SYSTEM AND METHOD FOR PRIORITIZING INDIVIDUAL STREAMS WITHIN A MULTIMEDIA FLOW

RELATED APPLICATION

This application claims the benefit of priority of U.S. provisional application Ser. No. 60/638,368, filed Dec. 20, 2004, which is relied on and incorporated herein by reference.

FIELD OF THE INVENTION

The present invention relates to network routing systems and methods. More specifically, the present invention relates to a system and method for prioritizing packets at a router for transmission in a network.

BACKGROUND OF THE INVENTION

Multimedia traffic, such as Voice over IP, can experience quality problems due to network congestion. This typically results in an increase in jitter—the variation in transmission delay of individual packets. Jitter can lead to degradation in the quality of a transmitted voice or video signal being transported in packet format over an IP network.

To improve the quality multimedia signals, it is known to prioritize delay-sensitive, real-time traffic, such as Voice over IP data that uses RTP (Real Time Transfer Protocol) or another suitable real-time protocol, over less time critical traffic, such as web access, email, or other data traffic. FIG. 1 shows a conventional system 10 for implementing such a class-based prioritization scheme. Packets 3 arrive in an input queue 2 at a router 4 and wait to be processed. During processing of each packet 3, the router 4 inspects information in a header of the packet to determine a destination address for the packet (e.g., a destination IP address). The router 4 then compares the destination address to a routing table that lists known destination addresses. The routing table associates each known destination address with an output link at the router 4 and with an output priority. After finding an entry in the routing table that includes the destination address for the packet, the router 4 stores the packet in an output queue that is associated with the output link and the output priority listed for the destination address.

In a conventional class-based queuing system, the router 4 also classifies the packet based on the type of data the packet contains and stores the packet in an output queue associated with the class of the packet. Thus, the router 4 may include multiple output queues, one for each class of packet or for each priority of traffic. For instance, the router 4 may include an RTP class queue 6 and a data class queue 8, wherein the RTP class queue 6 is given priority over the data class queue 8.

This approach can be effective, provided the proportion of real-time traffic is relatively low. If the proportion of real-time traffic is relatively high, this approach is ineffective because the delay-sensitive packets are not prioritized relative to each other and may be indiscriminately dropped in response to congestion. An ideal method would be to prioritize packets at an individual stream level, however this has been impractical to implement.

A need therefore exists for an improved solution to this problem that is scalable to very large networks.

SUMMARY OF THE INVENTION

The present invention answers this need by providing a system and method wherein delay-sensitive packets are identified and prioritized relative to each other, based on a delay variation estimated for each delay-sensitive packet by a quality of service monitor.

It is thus an object of the present invention to provide a system and method for prioritizing packets at a router for transmission in a network wherein late delay-sensitive packets are assigned a higher priority than, and are transmitted before, other delay-sensitive packets, thereby reducing the level of jitter and improving the quality of the packet streams that comprise late delay-sensitive packets.

Further objects, features and advantages will become apparent upon consideration of the following detailed description of the invention when taken in conjunction with the drawing and the appended claims.

DETAILED DESCRIPTION OF THE INVENTION

Figure 1:
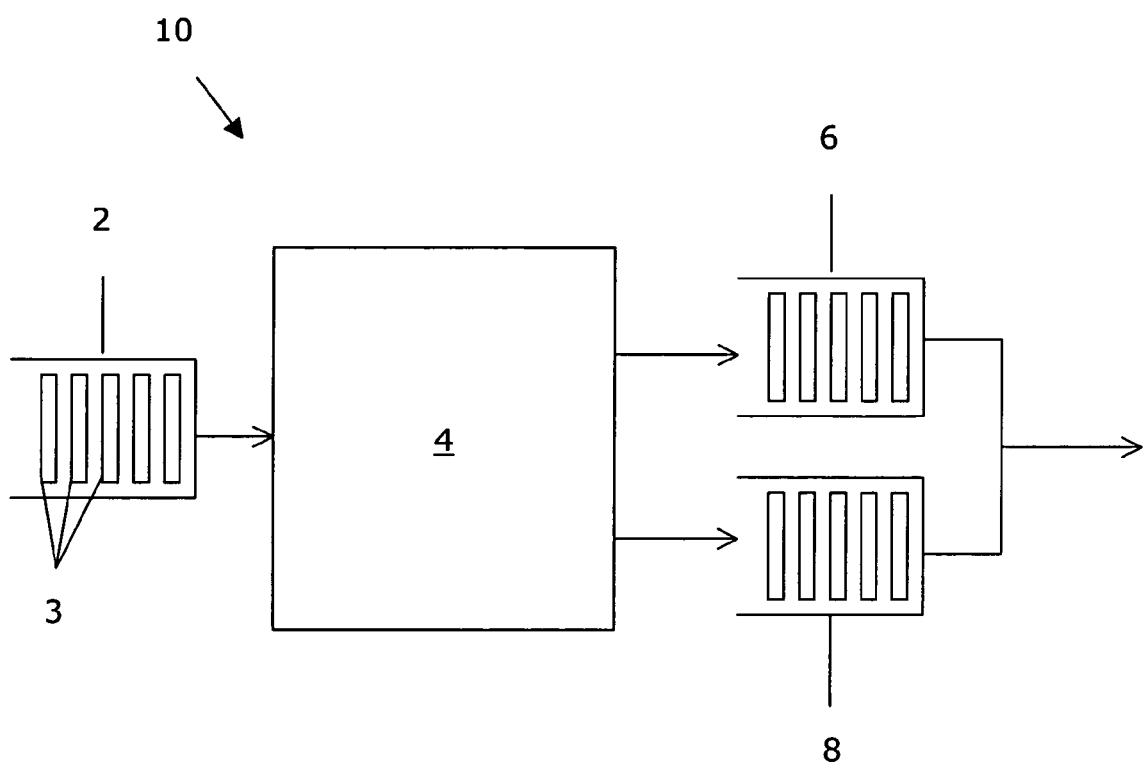
FIG. 1 is a relational diagram showing a conventional system for implementing a class-based packet prioritization scheme.
Figure 2:
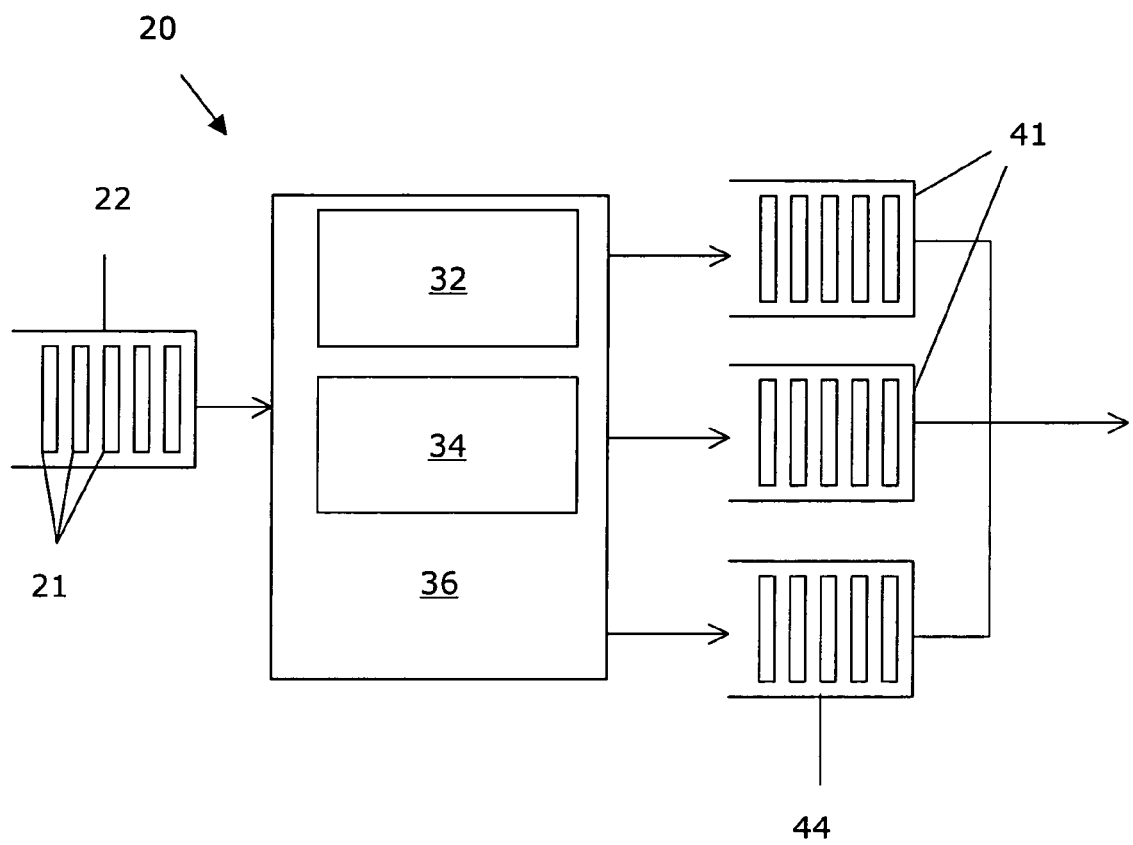
FIG. 2 is a relational diagram showing a system for prioritizing packets in an embodiment of the present invention.

With reference to FIG. 2, a system 20 in accordance with the present invention is shown for prioritizing packets received by a router 36 in a network. The router 36 may be any commercially available router that stores and forwards packets from one network, such as a LAN (Local Area Network) or WAN (Wide Area Network), to another. Thus, as previously described, packets 21 are received in an input queue 22 on the router 36 and each packet is processed by the router 36 for routing to its destination address.

In accordance with the present invention, a monitor 32 is provided at the router 36 for monitoring individual streams of packets for quality. Further, a priority manager 34 is provided at the router 36 for prioritizing the transmission of the packets from the router 36 based on quality measurements obtained by the monitor 32.

Monitor.

The monitor 32 analyzes each packet and determines whether the packet is delay-sensitive, i.e., whether the packet uses RTP or another suitable real-time protocol. If the packet is delay-sensitive, the monitor 32 estimates a delay variation for the packet. The delay variation, or jitter, for a packet is a metric that describes and quantifies whether the packet arrived early, on-time, or late with respect to an "ideal" arrival time.

As known in the art, delay-sensitive packets are transmitted from a source, such as an IP phone, a media gateway, a videoconferencing system, or the like, to a destination at regular intervals in a continuous packet stream. Accordingly, the packets are evenly spaced apart and have a constant delay when they leave the source. However, due to congestion or other problems in the network the delay between each packet may vary at when they reach the router 36, located between the source and the destination. Timestamps and sequence numbers transmitted with each packet are used by the monitor 32 at the router 36 to determine the ideal arrival time, based on a constant delay. The monitor 32 then compares the ideal arrival time with an actual arrival time at the router 36 to determine whether any variation in the delay between packets in the individual packet stream has occurred.

Thus, in accordance with an embodiment of the present invention, the monitor 32 calculates the ideal arrival time for a packet by subtracting the timestamp for an earlier packet in the packet stream from the timestamp for the current packet, and then adding this time difference to the actual arrival time measured for the packet. Using this information, the monitor 32 estimates the delay variation for the packet by subtracting the actual arrival time of the packet from the ideal arrival time of the packet. The monitor 32 then outputs the delay variation to the priority manager 34 for use in prioritizing the delay-sensitive packet, as described in further detail below.

The delay variation may also be used by the monitor 32 to perform various quality of service monitoring functions as known in the art. Because it is advantageous to provide a quality of service monitor at a router for monitoring the quality of delay-sensitive traffic and to estimate the delay variation of packets as part of such monitoring functionality, the present invention may provide beneficial priority management functions using existing quality of service information.

In various embodiments, the monitor 32 is a commercially available quality of service monitor such as VQmon, which is available from Telchemy, Incorporated. ("VQmon" is a trademark of Telchemy, Incorporated.) VQmon is more fully described in U.S. Pat. No. 6,741,569 entitled "Quality of Service Monitor for Multimedia Communications System," U.S. patent application Ser. No. 09/574,472 entitled "Dynamic Quality of Service Monitor," and U.S. patent application Ser. No. 10/802,536 entitled "Quality of Service Monitor for Multimedia Communications System," which are incorporated herein by reference.

Priority Manager.

The priority manager 34 uses the delay variation estimated by the monitor 32 to prioritize the delay-sensitive packet for transmission from the router. In one embodiment, the priority manager 34 prioritizes the delay-sensitive packet using a plurality of sub-class output queues. In another embodiment, the priority manager 34 prioritizes the delay-sensitive packet using at least one insertion queue.

1. Sub-Class Queues.

With continuing reference to FIG. 2, the priority manager 34, or the router 36 using a known class-based priority scheme, assigns the delay-sensitive packet to a delay-sensitive class and passes the delay-sensitive packet to a delay-sensitive queue associated with the delay-sensitive class. The priority manager 34, or the router 36, assigns each packet determined by the monitor 32, or the router 34, not to be delay-sensitive, i.e., to be a data packet, to one of a plurality of data classes and passes the data packet to a data queue 44 associated with the data class.

The delay-sensitive queue comprises a plurality of sub-class queues 41, wherein each sub-class queue 41 is associated with a weight. The weight is associated with the estimated delay variation of the delay-sensitive packet. The priority manager 34 assigns the delay-sensitive packet to the appropriate sub-class queue 41 based on the delay variation estimated by the monitor 32.

For example, the following Weights may be used:

| Weight | Delay Variation |
|---|---|
| 0 | Less than 10 milliseconds |
| 1 | 11-20 milliseconds |
| 2 | 21-40 milliseconds |
| 3 | 41-80 milliseconds |
| 4 | 81-120 milliseconds |
| 5 | 121 or more milliseconds |

In accordance with such an embodiment, the delay-sensitive queue would comprise six sub-class queues, one sub-class queue associated with each weight. The sub-class queue having a weight of 5 is given the highest priority. Thus, for example, a first delay-sensitive packet having an estimated delay variation of 130 milliseconds would be transmitted from the router 36 before a second delay-sensitive packet having an estimated delay variation of 89 milliseconds.

2. Insertion Queue

Figure 3:
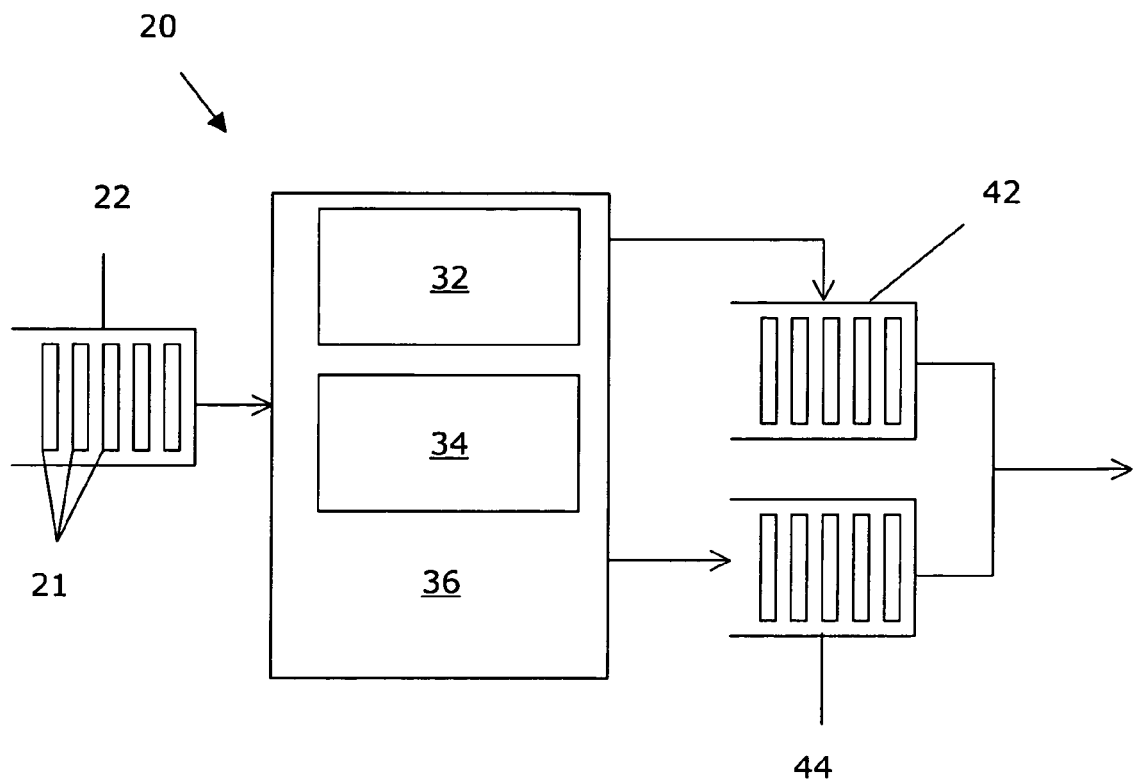
FIG. 3 is a relational diagram showing a system for prioritizing packets in another embodiment of the present invention.

In another embodiment, and with reference to FIG. 3, the priority manager 34 passes each delay-sensitive packet to an insertion queue 42 based on the delay variation estimated by the monitor 32. In particular, the priority manager 34 may compare the delay variation of the delay-sensitive packet to the delay variation of the delay-sensitive packets previously passed to the insertion queue and insert the delay-sensitive packet into the insertion queue ahead of any delay-sensitive packets having a lower positive or a negative delay variation. Thus, delay-sensitive packets with the highest delay variation are transmitted first from the router 36. The priority manager passes each packet determined by the monitor 32, or the router 34, not to be delay-sensitive, i.e., to be a data packet, to one of a plurality of data queues 44, wherein the delay-sensitive queue 42 is given a higher priority than the data queues 44.

Consequently, the present invention identifies individually late delay-sensitive packets and effectively shares the delay across multiple packet streams. Although such a solution may make the quality of each stream slightly worse, if there are a sufficient number of packet streams such an impact is minimal.

While this invention has been described with reference to preferred embodiments thereof, it is to be understood that variations and modifications can be affected within the spirit and scope of the invention as described herein and as described in the appended claims.

I claim:

1. A method for prioritizing a packet received at a router in a network, the method comprising the steps of:
 a. determining whether the packet is delay-sensitive;
 b. if the packet is delay-sensitive, estimating a delay variation of the packet by steps comprising:
  i. determining an actual arrival time for the packet at the router;
  ii. extracting a sending timestamp from the packet;
  iii. determining an actual arrival time for a preceding packet at the router;
  iv. extracting a sending timestamp from the preceding packet;
  v. subtracting the sending timestamp of step (iv) from the sending timestamp of step (ii);

vi. estimating an ideal arrival time for said packet by adding the result of step (v) to the actual arrival time of step (iii); and vii. estimating the delay variation of the packet by comparing the actual arrival time of step (i) with the ideal arrival time of step (vi); and c. if the packet is delay-sensitive, using the delay variation of the packet to prioritize the packet for transmission from the router.

2. The method of claim 1, wherein the using the delay variation of the packet to prioritize the packet for transmission from the router includes:

a. assigning the packet a weight, wherein the weight is associated with the delay variation of the packet;

b. passing the packet to a sub-class queue, wherein the sub-class queue is associated with the weight; and c. assigning a priority to the sub-class queue relative to a second sub-class queue, wherein the second sub-class queue is associated with a different weight.

3. The method of claim 1 wherein the using the delay variation of the packet to prioritize the packet for transmission from the router includes inserting the packet into an insert queue for transmission before a second delay-sensitive packet in the insert queue, wherein the second delay-sensitive packet has a lower estimated delay variation than the estimated delay variation of the packet.

4. A system for prioritizing a packet received at a router in a network comprising:

a. a monitor for determining whether the packet is delay-sensitive and, if the packet is delay-sensitive, estimating a delay variation of the packet; and b. a priority management component for using the delay variation of the packet to prioritize the packet for transmission from the router if the packet is delay-sensitive;

wherein the monitor is configured to:

i. determine an actual arrival time for the packet at the router;

ii. extract a sending timestamp from the packet;

iii. determine an actual arrival time for a preceding packet at the router;

iv. extract a sending timestamp from the preceding packet;

v. subtract the sending timestamp of step (iv) from the sending timestamp of step (ii);

vi. estimate an ideal arrival time for said packet by adding the result of step (v) to the actual arrival time of step (iii); and vii. estimate the delay variation of the packet by comparing the actual arrival time of step (i) with the ideal arrival time of step (vi).

5. The system of claim 4 wherein the priority management component is configured to:

a. assign the packet a weight, wherein the weight is associated with the delay variation of the packet;

b. pass the packet to a sub-class queue, wherein the sub-class queue is associated with the weight; and c. assign a priority to the sub-class queue relative to a second sub-class queue, wherein the second sub-class queue is associated with a different weight.

6. The system of claim 4 wherein the priority management component is configured to insert the packet into an insert queue for transmission before a second delay-sensitive packet in the insert queue, wherein the second delay-sensitive packet has a lower estimated delay variation than the estimated delay variation of the packet.

* * * * *